United States Patent
Huy

(10) Patent No.: US 11,812,845 B2
(45) Date of Patent: Nov. 14, 2023

(54) IONIC TOOTHBRUSH

(71) Applicant: Church & Dwight Co., Inc., Princeton, NJ (US)

(72) Inventor: Gerhart P. Huy, Hamilton Square, NJ (US)

(73) Assignee: Church & Dwight Co., Inc., Princeton, NJ (US)

( * ) Notice: Subject to any disclaimer, the term of this patent is extended or adjusted under 35 U.S.C. 154(b) by 156 days.

(21) Appl. No.: 17/346,431

(22) Filed: Jun. 14, 2021

(65) Prior Publication Data

US 2021/0386192 A1    Dec. 16, 2021

Related U.S. Application Data

(60) Provisional application No. 63/039,085, filed on Jun. 15, 2020.

(51) Int. Cl.
| | |
|---|---|
| A46B 15/00 | (2006.01) |
| A46B 5/00 | (2006.01) |
| A46B 5/02 | (2006.01) |
| A61C 17/34 | (2006.01) |
| A46B 13/02 | (2006.01) |
| A46B 9/04 | (2006.01) |

(52) U.S. Cl.
CPC ........ *A46B 15/0024* (2013.01); *A46B 5/0095* (2013.01); *A46B 5/02* (2013.01); *A46B 9/04* (2013.01); *A46B 13/02* (2013.01); *A61C 17/3436* (2013.01); *A61C 17/3445* (2013.01)

(58) Field of Classification Search
CPC ............ A46B 15/0024; A46B 15/0022; A46B 5/0095; A46B 5/02; A46B 9/04; A46B 13/02; A61C 17/3436; A61C 17/3445
See application file for complete search history.

(56) References Cited

U.S. PATENT DOCUMENTS

| | | | |
|---|---|---|---|
| 2,044,863 | A | 6/1936 | Sticht |
| 2,657,321 | A | 10/1953 | Smithson |
| 2,834,344 | A | 5/1958 | Masakuni |
| 4,691,718 | A | 9/1987 | Sakuma et al. |
| 4,969,868 | A | 11/1990 | Wang |

(Continued)

FOREIGN PATENT DOCUMENTS

| | | |
|---|---|---|
| CN | 203898475 | 10/2014 |
| DE | 102018101185 | 7/2019 |

(Continued)

*Primary Examiner* — Brian D Keller
*Assistant Examiner* — Robert C Moore
(74) *Attorney, Agent, or Firm* — Church & Dwight Co., Inc.

(57) ABSTRACT

The disclosure provides an ionic toothbrush having an elongated body that may be configured to have a one-piece design, or alternatively one or more components of the ionic toothbrush may be removable and/or replaceable. In some embodiments, the present disclosure provides an ionic toothbrush which includes a handle portion, a brush head portion including a plurality of bristle tufts; and an electrical circuit configured to transmit a negative electrical charge through at least a portion of the brush head, wherein the electrical circuit includes one or more sections of conductive resin present on an outer surface of one or both of the handle portion and the brush head portion.

16 Claims, 8 Drawing Sheets

(56) References Cited

U.S. PATENT DOCUMENTS

| | | |
|---|---|---|
| 6,341,400 B1 | 1/2002 | Kobayashi et al. |
| 6,360,395 B2 | 3/2002 | Blaustein et al. |
| 7,240,390 B2 | 7/2007 | Pfenniger et al. |
| 7,857,620 B2 | 12/2010 | Shih et al. |
| 7,886,398 B2 | 2/2011 | Morita et al. |
| 8,145,325 B2 | 3/2012 | Taniguchi et al. |
| 8,239,991 B2 | 8/2012 | Shimizu et al. |
| 8,413,282 B2 | 4/2013 | Cai et al. |
| 8,413,285 B2 * | 4/2013 | Kunita ............... A46B 15/0022 604/20 |
| 8,677,542 B1 | 3/2014 | Whillock |
| 9,192,762 B2 | 11/2015 | Doll et al. |
| 2003/0084527 A1 | 5/2003 | Brown et al. |
| 2007/0232983 A1 | 10/2007 | Smith |
| 2008/0083074 A1 | 4/2008 | Taniguchi et al. |
| 2008/0183249 A1 | 7/2008 | Kitagawa et al. |
| 2012/0233791 A1 | 9/2012 | Uchida et al. |
| 2016/0143430 A1 | 5/2016 | Davidov |
| 2016/0199165 A1 | 7/2016 | Nikitczuk |
| 2017/0360973 A1 | 12/2017 | Saue |
| 2018/0255916 A1 | 9/2018 | Levi et al. |

FOREIGN PATENT DOCUMENTS

| | | | |
|---|---|---|---|
| GB | 2317555 | 12/2000 | |
| JP | H03237902 A * | 10/1991 | |
| JP | 2560162 | 12/1996 | |
| JP | 2008212350 | 9/2008 | |
| JP | 1280506 | 3/2009 | |
| JP | 5246089 | 4/2013 | |
| JP | 2014050640 | 3/2014 | |
| JP | 6057646 | 12/2016 | |
| JP | 3216414 | 5/2018 | |
| JP | 3216415 | 5/2018 | |
| JP | 6345717 | 6/2018 | |
| JP | 6405023 | 10/2018 | |
| JP | 2019013405 | 1/2019 | |
| WO | WO-2005023146 A2 * | 3/2005 | ......... A46B 15/0036 |
| WO | 2018/099770 | 6/2018 | |

* cited by examiner

IONIC TOOTHBRUSH

CROSS-REFERENCE TO RELATED APPLICATIONS

The present application claims priority to U.S. Provisional Patent Application No. 63/039,085, filed Jun. 15, 2020, the disclosure of which is incorporated herein by reference in its entirety.

FIELD OF THE DISCLOSURE

The disclosure relates to electric toothbrushes, and in particular electric toothbrushes having ionic characteristics, which may optionally have a replaceable brush head section, a handle portion, and one or more moveable bristle heads within the brush head section.

BACKGROUND

The electric toothbrush has appeared in the patent literature since at least as early as the 1930s. See U.S. Pat. No. 2,044,863. A discussion of different types of electric toothbrushes can be found in U.S. Patent Publication No. 2003/0084527A1. Early powered toothbrushes were bulky and unnecessarily complex. See U.S. Pat. No. 2,657,321. Over the years, there has been a steady improvement and evolution of the basic electric toothbrush and parts thereof from the handle through, and including, the brush head, its motion and the bristle arrangement, material, size distribution, material pattern, grouping and rigidity of the brush head bristles. The art also shows toothbrushes specifically designed to address special problems. See U.S. Pat. No. 8,677,542.

One recent addition to powered toothbrushes has been elements for generating ionic charges in the mouth of a user. Such ionic toothbrushes typically include a power source, a metal rod extending to the brush head, and a metal contact on the brush handle. Because of the need for internal, charge conducting components, it has previously been difficult to provide the effects of ion production with mechanical benefit of a moveable brush head. Accordingly, there remains a need in the art for further, powered toothbrushes that can provide the combined benefits of mechanical movement and ion production.

SUMMARY OF THE INVENTION

The present disclosure relates to a personal hygiene device, and more particularly, an ionic electric toothbrush for cleaning one's teeth and/or gums with improved performance characteristics comparable to those of currently commercially available ionic and/or electric toothbrush products. In some embodiments the ionic toothbrush according to the present disclosure may include a replaceable brush head section having fewer parts and reduced manufacturing costs as compared to other commercially available products.

Some aspects of the present disclosure provide for an ionic toothbrush comprising a handle portion, a brush head portion including a plurality of bristle tufts, and an electrical circuit configured to transmit a negative electrical charge through at least a portion of the brush head, wherein the electrical circuit includes one or more sections of conductive resin present on an outer surface of one or both of the handle portion and the brush head portion. In some embodiments, the handle portion includes a section of conductive resin present at an outer surface thereof and positioned so as to be in contact with a hand of an individual when the ionic toothbrush is in use. In some embodiments, the brush head portion includes a section of conductive resin present at an outer surface thereof. In some embodiments, the handle portion and the brush head portion are in a one-piece design. In other embodiments, the brush head portion may be removable and/or replaceable.

In some embodiments, the handle portion comprises an outer housing, a power source, a positive ionic contact, and a negative ionic contact, wherein the power source, the positive ionic contact, and the negative ionic contact are all positioned within the outer housing. In some embodiments, the handle portion further comprises a first conductive surface and a second conductive surface separate from the first conductive surface, both being positioned on the outer housing of the handle portion. In some embodiments, one or both of the first conductive surface and the second conductive surface includes a conductive resin. In some embodiments, the first conductive surface is in electrical communication with the positive ionic contact, the second conductive surface is in electrical communication with the negative ionic contact, and both conductive surfaces are in electrical communication with the power source forming the electrical circuit.

In some embodiments, the electrical circuit is activated when a user's hand comes into contact with the first conductive surface closing the electrical circuit. In some embodiments, a negative charge is generated in the conductive resin present at the outer surface of the brush head upon activation. In some embodiments, the first conductive surface and the second conductive surface are positioned sufficiently separate from each other so as to prevent a user from contacting both conductive surfaces simultaneously during use. In some embodiments, the second conductive surface extends no more than about 15 mm from a top portion of the outer housing of the handle portion. In some embodiments, the ionic toothbrush may further comprise a conductive head ring adapted for engagement between the handle portion and the brush head portion to form an elongated body. In some embodiments, the conductive head ring includes a section of conductive resin present at an outer surface thereof. In some embodiments, the conductive resin remains in continuous contact throughout at least a portion of the brush head portion, the conductive head ring, and the handle portion.

In some embodiments, the conductive resin may comprise an electrically conductive thermoplastic polymer or resin material. In some embodiments, the brush head portion may further comprise a translation head attached to a bristle support member having the plurality of bristle tufts contained thereon. In some embodiments, the ionic toothbrush may further comprise a motor and a drive rod positioned within the handle portion, wherein the drive rod is configured to engage the translation head when the ionic toothbrush is in use. In some embodiments, the motor may be operatively coupled with the drive rod in the handle portion such that actuation of the motor linearly and bi-directionally effectuates movement of the drive rod that is communicated to the translation head to effect a movement of the bristle support member in at least one direction, either linearly or rotationally.

The disclosure includes, without limitations, the following embodiments.

Embodiment 1: An ionic toothbrush comprising: a handle portion; a brush head portion including a plurality of bristle tufts; and an electrical circuit configured to transmit a negative electrical charge through at least a portion of the brush head, wherein the electrical circuit includes one or more sections of conductive resin present on an outer surface of one or both of the handle portion and the brush head portion.

Embodiment 2: The ionic toothbrush according to claim 1, wherein the handle portion includes a section of conductive resin present at an outer surface thereof and positioned so as to be in contact with a hand of an individual when the ionic toothbrush is in use.

Embodiment 3: The ionic toothbrush according to any of claims 1-2, wherein the brush head portion includes a section of conductive resin present at an outer surface thereof.

Embodiment 4: The ionic toothbrush according to any of claims 1-3, wherein the handle portion and the brush head portion are in a one-piece design.

Embodiment 5: The ionic toothbrush according to any of claims 1-3, wherein the brush head portion is removable and/or replaceable.

Embodiment 6: The ionic toothbrush according to any of claims 1-5 wherein the handle portion comprises an outer housing, a power source, a positive ionic contact, and a negative ionic contact, wherein the power source, the positive ionic contact, and the negative ionic contact are all positioned within the outer housing.

Embodiment 7: The ionic toothbrush according to any of claims 1-6, wherein the handle portion further comprises a first conductive surface and a second conductive surface separate from the first conductive surface, both being positioned on the outer housing of the handle portion.

Embodiment 8: The ionic toothbrush according to any of claims 1-7, wherein one or both of the first conductive surface and the second conductive surface includes a conductive resin.

Embodiment 9: The ionic toothbrush according to any of claims 1-8, wherein the first conductive surface is in electrical communication with the positive ionic contact, the second conductive surface is in electrical communication with the negative ionic contact, and both conductive surfaces are in electrical communication with the power source forming the electrical circuit.

Embodiment 10: The ionic toothbrush according to any of claims 1-9, wherein the electrical circuit is activated when a user's hand comes into contact with the first conductive surface closing the electrical circuit.

Embodiment 11: The ionic toothbrush according to any of claims 1-10, wherein a negative charge is generated in the conductive resin present at the outer surface of the of the brush head upon activation.

Embodiment 12: The ionic toothbrush according to any of claims 1-11, wherein the first conductive surface and the second conductive surface are positioned sufficiently separate from each other so as to prevent a user from contacting both conductive surfaces simultaneously during use.

Embodiment 13: The ionic toothbrush according to any of claims 1-12, wherein the second conductive surface extends no more than about 15 mm from a top portion of the outer housing of the handle portion.

Embodiment 14: The ionic toothbrush according to any of claims 1-13, further comprising a conductive head ring adapted for engagement between the handle portion and the brush head portion to form an elongated body.

Embodiment 15: The ionic toothbrush according to any of claims 1-14, wherein the conductive head ring includes a section of conductive resin present at an outer surface thereof.

Embodiment 16: The ionic toothbrush according to any of embodiments 1-15, wherein the conductive resin remains in continuous contact throughout at least a portion of the brush head portion, the conductive head ring, and the handle portion.

Embodiment 17: The ionic toothbrush according to any of embodiments 1-16, wherein the conductive resin comprises an electrically conductive thermoplastic polymer or resin material.

Embodiment 18: The ionic toothbrush according to any of embodiments 1-17, wherein the brush head portion further comprises a translation head attached to a bristle support member having the plurality of bristle tufts formed thereon.

Embodiment 19: The ionic toothbrush according to any of embodiments 1-18, further comprising a motor and a drive rod positioned within the handle portion, wherein the drive rod is configured to engage the translation head when the ionic toothbrush is in use.

Embodiment 20: The ionic toothbrush according to any of embodiments 1-19, wherein the motor is operatively coupled with the drive rod in the handle portion such that actuation of the motor linearly and bi-directionally effectuates movement of the drive rod that is communicated to the translation head to effect a movement of the bristle support member in at least one direction, either linearly or rotationally.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise.

BRIEF DESCRIPTION OF THE DRAWINGS

Figure 1:
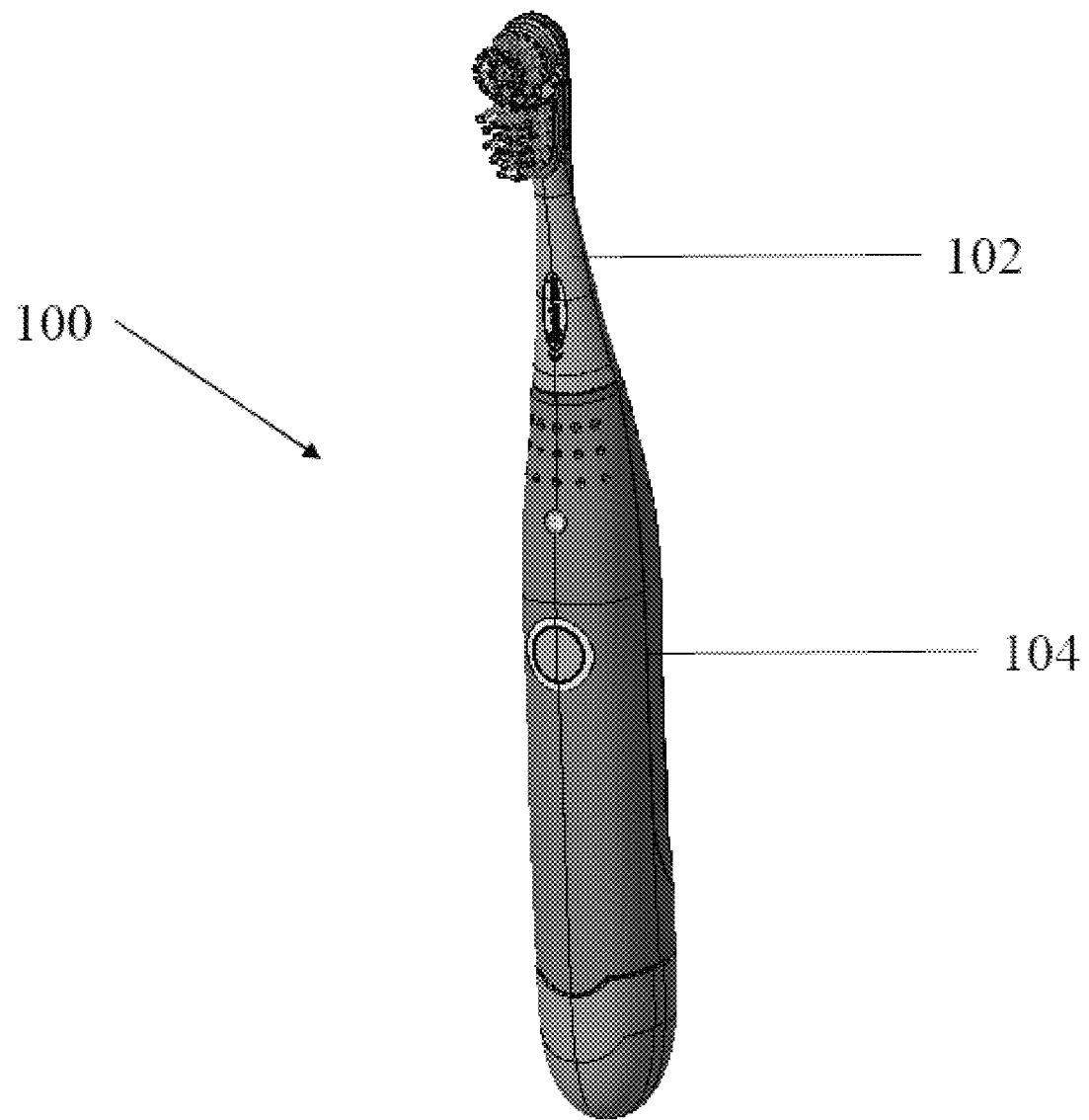

Having thus described aspects of the disclosure in the foregoing general terms, reference will now be made to the accompanying drawing, which is not necessarily drawn to scale. The drawing is exemplary only, and should not be construed as limiting the disclosure.

Figure 2:
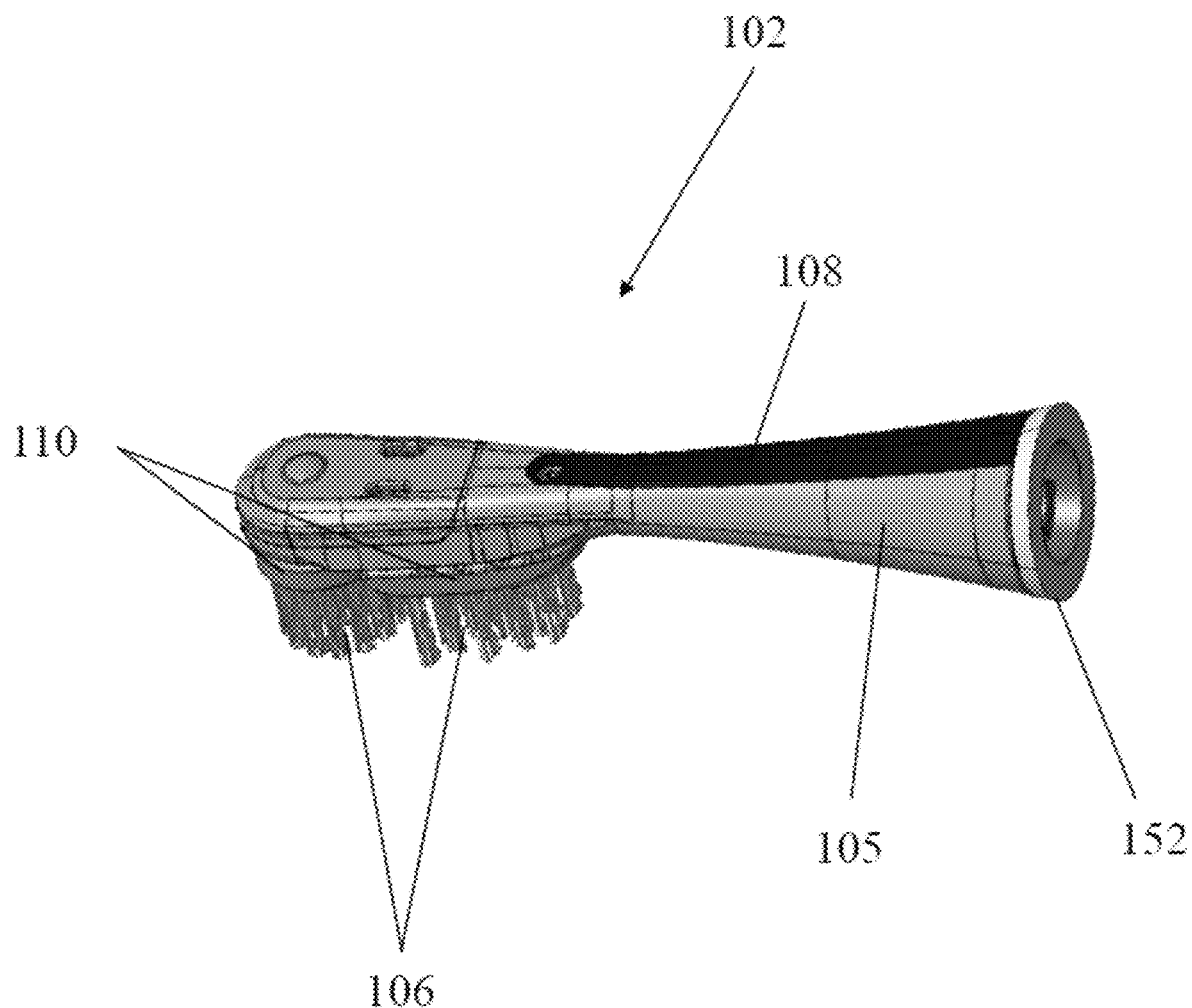
Figure 3:
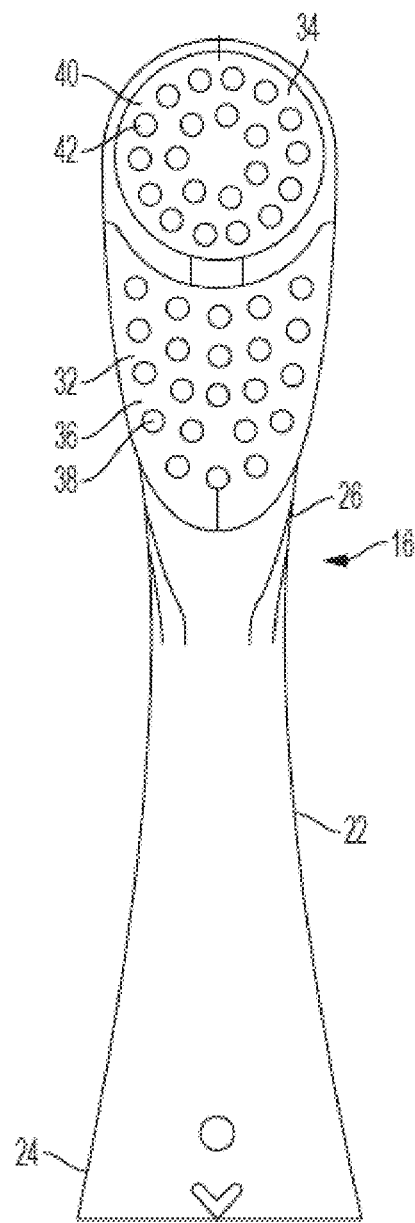
Figure 4:
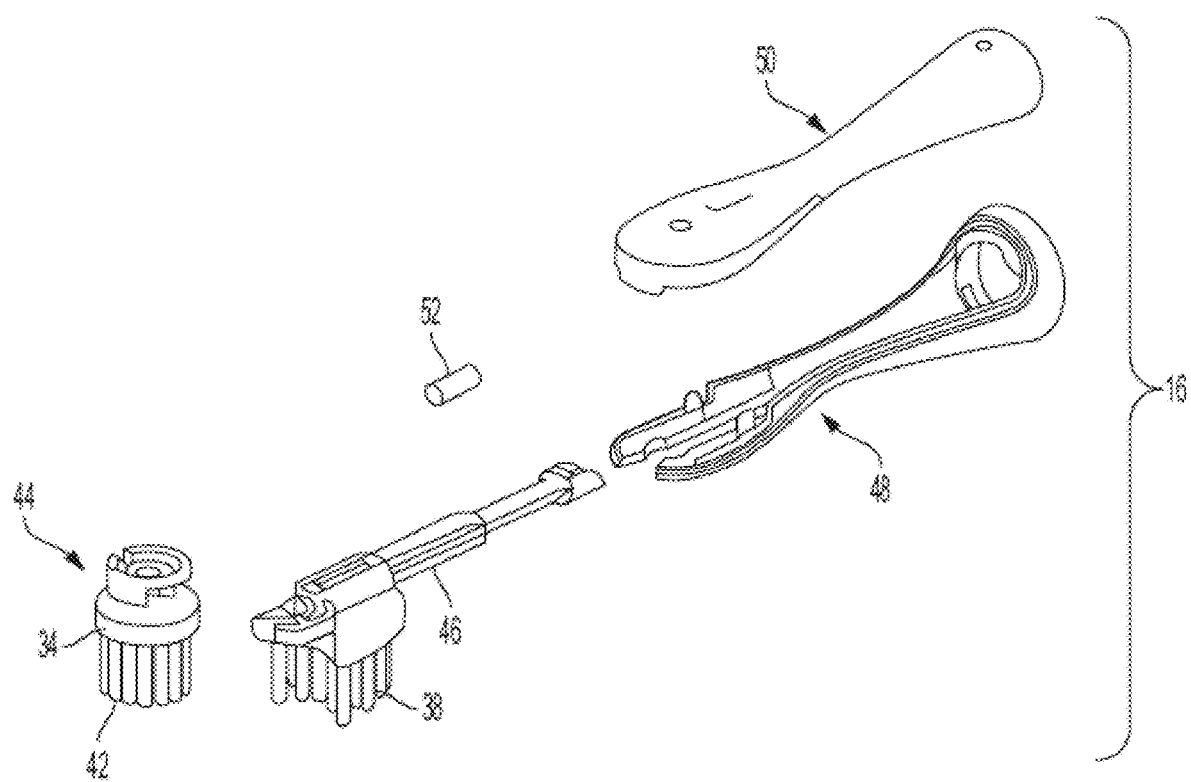
Figure 5:
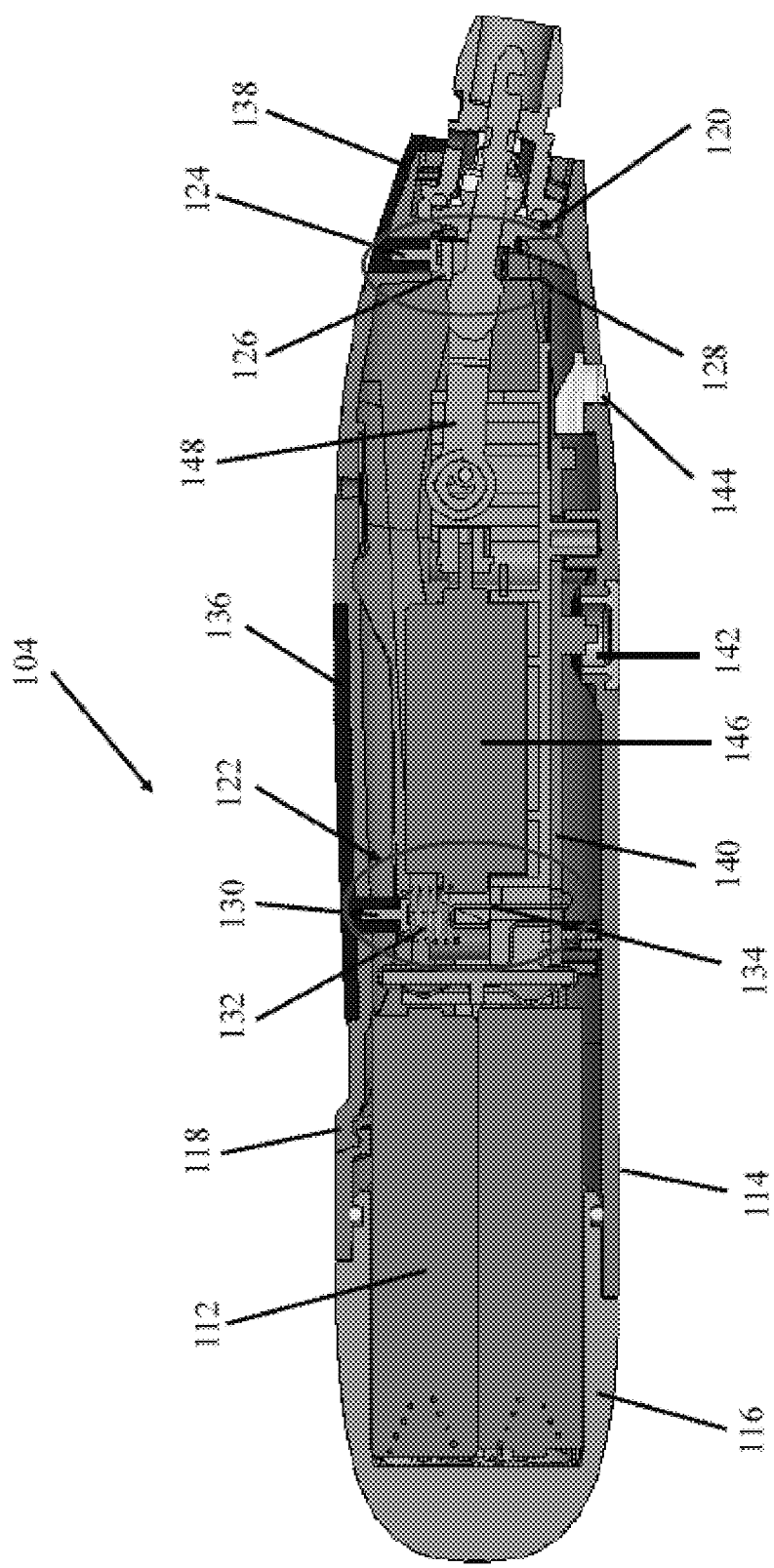
Figure 6:
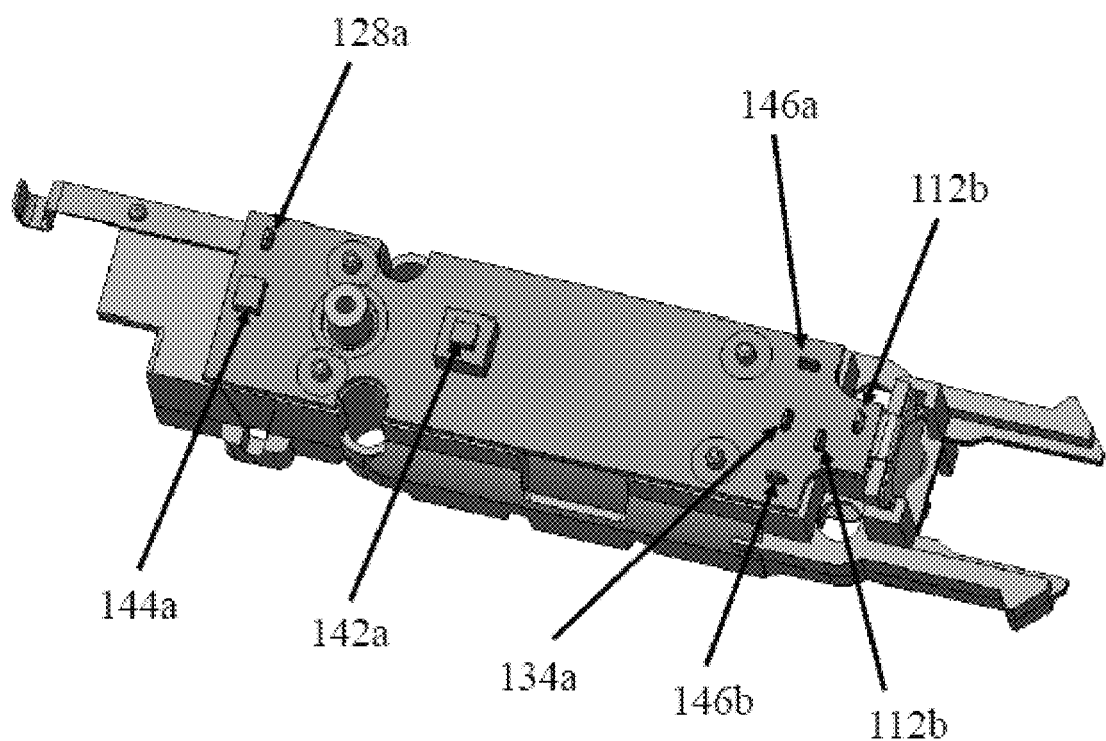
Figure 7:
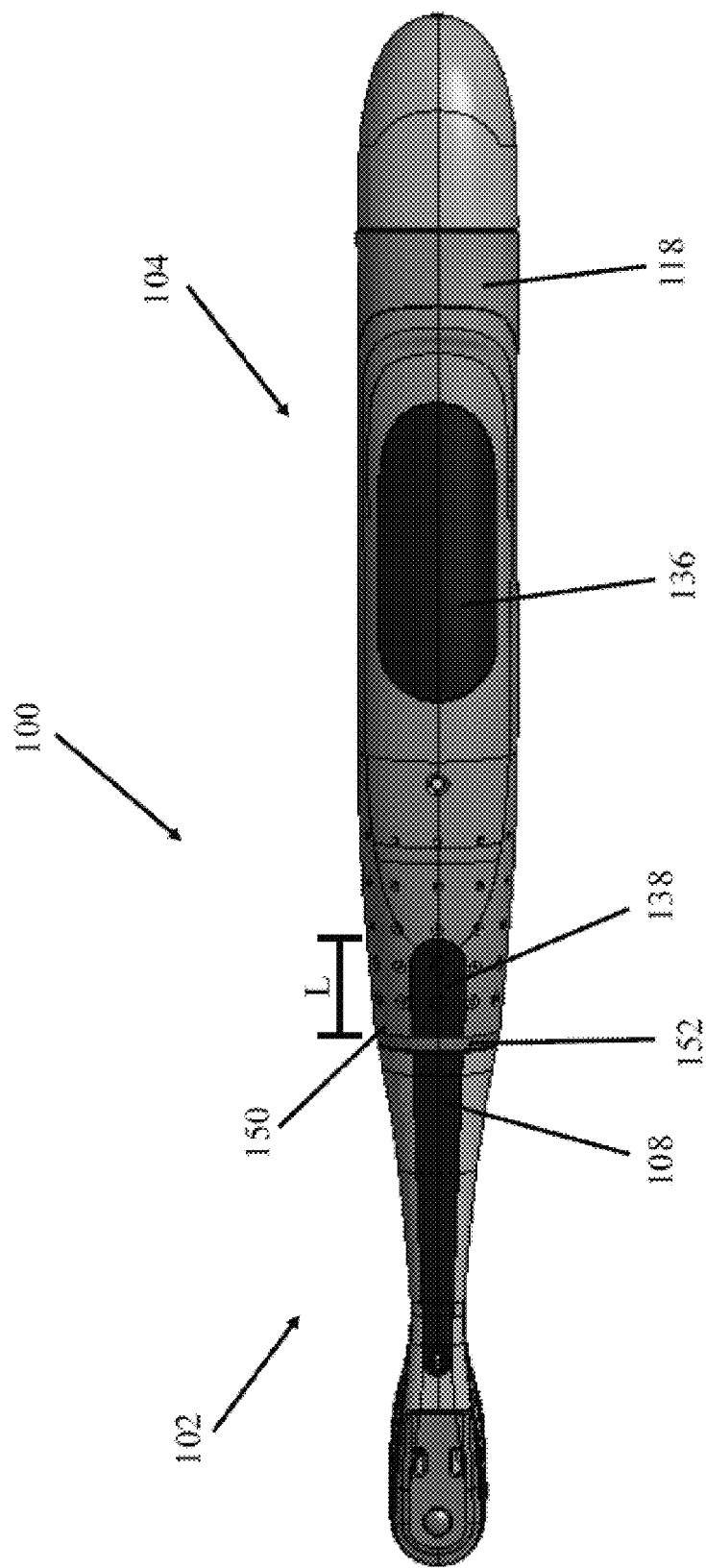
Figure 8:
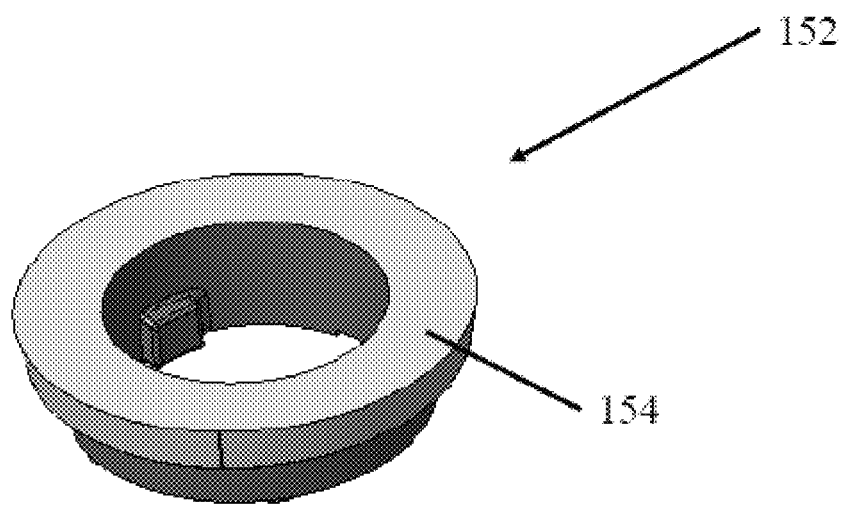

FIG. 1 illustrates a front perspective view of an ionic toothbrush according to an example embodiment of the present disclosure;

FIG. 2 illustrates an enlarged side perspective view of a brush head portion of the ionic toothbrush, according to an example embodiment of the present disclosure;

FIG. 3 illustrates an enlarged front planar view of a brush head portion, according to an example embodiment of the present disclosure;

FIG. 4 illustrates an exploded component view of the brush head portion in FIG. 3, according to an example embodiment of the present disclosure;

FIG. 5 illustrates a cross-sectional component view of a handle portion of the ionic toothbrush, according to an example embodiment of the present disclosure;

FIG. 6 illustrates an enlarged component view of a control component assembly including power source negative and positive terminals, motor negative and positive terminals, a positive ionic terminal, a negative ionic terminal, an input terminal, and an indicator terminal, according to an example embodiment of the present disclosure;

FIG. 7 illustrates a horizontal, rear view of an ionic toothbrush, according to an example embodiment of the present disclosure; and FIG. 8 illustrates an enlarged perspective view of a conductive head ring of the ionic toothbrush, according to an example embodiment of the present disclosure.

DETAILED DESCRIPTION

The present disclosure will now be described more fully hereinafter with reference to example embodiments thereof. These example embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. As used in this specification and the claims, the singular forms "a," "an," and "the" include plural referents unless the context clearly dictates otherwise. As used herein, the term "forward" is intended to refer to the direction extending away from the handle of the toothbrush towards the brush head while the term "rearward" refers to a direction from the head section going towards the handle end of the device. The term "longitudinal" refers to a lengthwise aspect of an element or object as observed in a planar view of the element or object. A "longitudinal axis" is an axis that corresponds with, or is at least substantially coincident with, the longitudinal direction of the element or object. Where a head or neck is angled with respect to each other or the handle, each of their respective longitudinal axes may not lie in the same plane but the axes do extend in the same general longitudinal direction in a top planar view.

Some aspects of the present disclosure relate to a toothbrush having ionic characteristics (e.g., referred to herein as an "ionic, electric toothbrush" and/or an "ionic toothbrush"). Generally, it should be noted that dental plaque (an undesirable composition that builds up on a person's teeth over time) has been shown to carry a positive charge which attracts this plaque to a person's teeth, in particular, due to the surface of teeth being slightly, negatively charged. This phenomenon makes plaque removal difficult using conventional brushing techniques because the positively charged plaque molecules remain attracted to the negatively charged surfaces of a user's teeth. Advantageously, however, brushing with an ionic toothbrush (e.g., such as an ionic toothbrush as described herein) can provide greater plaque removal and better brushing efficiency because a negative electric field is generated on and/or around the ionic brush head during use, which attracts plaque molecules away from the surfaces of a user's teeth. Without intending to be bound by theory, it should be noted that during brushing with an ionic toothbrush the mixture of saliva and salt (contained within the dentifrice formulation) creates a negatively charged solution within the oral cavity that further attracts plaque molecules. Some embodiments of the present disclosure provide for an ionic toothbrush that is also electronic, for example, providing even better brushing efficiency by combining the advantages of an ionic brush head with the advantages of providing mechanical movement of some or all of the bristles in that ionic brush head, simultaneously during use.

In one aspect, the present disclosure provides an electric toothbrush having one or more ionic characteristics (e.g., configured to deliver a negative charge to a user's mouth during use). In some embodiments, for example, a negative charge may be generated by a power source within the ionic toothbrush and this negative charge can be translated via one or more contacts (e.g., terminals, wires, circuitry, hard wiring, and the like) and/or conductive surfaces (e.g., conductive resins or polymers) on or within the ionic toothbrush to a brush head section of the ionic toothbrush that is inserted into the mouth of a user of the ionic toothbrush during use. FIG. 1 depicts an embodiment of an ionic toothbrush 100 comprising both a brush head portion 102 and a handle portion 104. In some embodiments, the handle portion and the brush head portion may form a one-piece design, for example, wherein the brush head portion and the handle portion are permanently connected forming a singular elongated body. In other embodiments, the brush head portion and the handle portion may represent two separate and distinct components of the ionic toothbrush. For example, in such embodiments, the brush head section and the handle portion may be adapted for engagement therebetween. Such an engagement may be in the form of a screw-fit engagement, a press fit engagement, a magnetic engagement, a snap-fit engagement, or any other type of engagement suitable for forming a connection between the brush head portion and the handle portion. In such embodiments, the ionic toothbrush may form a singular elongated body when engaged. In still other embodiments, the ionic toothbrush may comprise one or more other components suitable for engagement with, or between, the brush head section and the handle portion of the ionic toothbrush (e.g., such as a conductive head ring). Generally, the brush head portion 102 and the handle portion 104 are at least substantially co-linear along a longitudinal axis. As such, the brush head portion 102 and the handle portion 104 may each have longitudinal axes that are substantially parallel. Alternatively, the brush head portion 102 may have a longitudinal axis that is orthogonal to a longitudinal axis of the handle portion 104 (e.g., as shown in FIG. 1 herein). Suitable angular arrangements that may be implemented according to the present disclosure are illustrated in U.S. Pub. Pat. App. No. 2016/0199165 and U.S. Pat. No. 6,360,395, the disclosures of which are incorporated herein by reference. Preferably, the handle portion is of an ergonomic design, including depressions and grip areas, to provide for ease of use and comfort of the ionic toothbrush. Various embodiments, features, and configurations of ionic toothbrushes, and individual components thereof, will be discussed in further detail herein below.

As noted above, an ionic toothbrush according to the present disclosure may include both a brush head portion 102 and a handle portion 104. In some embodiments, such as the embodiment depicted in FIG. 2, the brush head portion may comprise an elongate body 105 with a plurality of bristle tufts 106. Generally, the brush head portion 102 may be molded from a variety of different materials. For example, in some embodiments, at least a portion of the elongate body 105 of the brush head portion may be molded from a plastic material and/or a polymer material. Suitable materials useful for molding the brush head portion may include, but are not limited to, plastics, polymers, epoxies, resins, rubber, metals, and the like. In some embodiments, an outer surface 108 of the brush head portion may include a conductive resin thereon. The conductive resin may be applied to the outer surface of the brush head section via any method commonly known in the art, e.g., molded, overlaid, stamped, and the like. For example, the conductive resin may be applied to the outer surface of the outer housing via injection molding (e.g., such as 2K injection molding), over molding, insert molding, runner molding, and the like. A "conductive resin" as used herein, refers to any type of natural or synthetic, resinous and/or polymeric material effective for conducting an electrical charge (e.g., configured for movement of ions therethrough). In some embodiments, for example, the conductive resin may comprise an electrically conductive thermoplastic polymer or an electrically conductive resin material. In some embodiments, the conductive resin may include a variety of different materials, including, but not limited to, plastic materials, polymer materials, resin materials, and the like. Some examples of conductive resins include, but are not limited to, acrylic, acrylonitrile butadiene styrene (ABS), polylactic acid (PLA), polybenzimidazole (PBI), polycarbonate (PC), polyether sulfone (PES), polyoxymethylene (POM), polyether ether ketone (PEEK), polyetherimide (PEI), polyethylene (PE), polyphenylene oxide (PPO), polyphenylene sulfide (PPS), polypropylene (PP), polystyrene (PS), polyvinyl chloride (PVC), polyvinylidene fluorine (PVDF), polytetrafluoroethylene (PTFE), various epoxy resins and adhesives, and the like. A conductive resin may be inherently conductive, such as a so-called intrinsically conducting polymer (ICP). Alternatively, or additionally, a conductive resin may be electrically conductive partially, primarily, or completely due to the presence therein of electrically conductive particles, such as metal particles, that may be dispersed throughout the conductive resin.

Generally, the configuration and/or features of the brush head portion 102, the positioning, arrangement, and/or composition of the plurality of bristle tufts 106 thereon, and the functionality thereof may vary. For example, in some embodiments, the arrangement of the bristles tufts, bristle hardness, geometry, and three dimensional orientations can be varied. In some embodiments, the plurality of bristle tufts may be connected or attached to one or more bristle support members 110 within the brush head portion 102. For instance, the bristles can be positioned in various patterns on their respective support members and grouped or mixed according to hardness, thickness and/or length. The bristles may be oriented in a vertical configuration normal to the respective bristle support member surface or angularly offset from the vertical relative to their respective bristle support member. In some embodiments, the brush head portion may include one or more additional components, configurations, and/or functionalities thereof. For example, in some embodiments, the brush head portion may comprise more than one plurality of bristle tufts, e.g., at least two, at least three, at least four, or more pluralities of bristles tufts positioned thereon. In some embodiments, one or more pluralities of bristle tufts 106 may each be independently attached to one or more bristle support members 110 which optionally may be engaged with one or more other components within the brush head portion (e.g., such as a drive rod or a translation head 46 as depicted in FIG. 4) that facilitate movement of the plurality of bristle tufts, for example, linearly and/or rotationally. In some embodiments, each individual plurality of bristle tufts may independently, be configured for movement thereof, e.g., either linearly or rotationally. In such embodiments, the ionic toothbrush may be characterized as having a "dual-action" and/or "multi-action" brush head portion which is capable of providing independent movement of two or more sections of bristles positioned thereon.

Some examples of brush head sections, and in particular dual-action brush head sections, suitable for use in ionic toothbrushes as described herein (not including the conductive resin present at the outer surface 108 thereof) are described in more detail, for example, in U.S. Pub. Pat. App. No. 2016/0199165 to Nikitczuk, which is incorporated by reference herein in its entirety. (See, e.g., the replaceable multi-action brush head section described in FIGS. 2-8 of U.S. Pub. Pat. App. No. 2016/0199165, in particular, describing a brush head section 16 that is formed of a neck section 22 which has a rearward section 24 and a forward section 26. The rearward section 24 is adapted for a quick and simple attachment to a handle 14 at a forward end 28 thereof such as by inserting the brush head section into the handle and turning it to snap-lock with the handle. As more clearly illustrated in FIG. 2, in a preferred embodiment, brush head 16 is a multi-brush head section having a first tufted bristle pad support or lower head 32 and a second tufted bristle pad support or upper head 34. In a preferred embodiment, the first bristle pad support 32 has a partial ellipse geometry and the second bristle support pad 34 has a rounded or circular configuration. The first bristle pad 32 is formed of a bristle support 36 and a plurality of bristles or bristle tufts 38. The second bristle pad 34 is likewise formed of a bristle support 40 and a plurality of bristles or bristle tufts 42. FIG. 3 shows in perspective an exploded partial assembly view of the brush head section 16. Brush head section 16 is composed of a number of easily assembled component parts. As shown, brush head section 16 is formed of an oscillation head 44, a translation plate or head 46, a lower head shell 48, an upper head shell 50, and a return mechanism 52.) It should be noted that the brush head sections 16 included in Nikitczuk, including various features and/or components thereof, e.g., as depicted in FIGS. 3 and 4 herein, may be adapted for use as the brush head portion 102 described herein including having a section of conductive resin present on the body thereof.

As noted above, the ionic toothbrush 100 may also include a handle portion 104. As depicted in FIG. 5, in some embodiments, the handle portion 104 may comprise a power source 112 and an outer housing 114. In some embodiments, the power source 112 may be positioned at least partially within the outer housing 114. In some embodiments, the power source 112 may comprise any suitable form of battery capable of powering the ionic toothbrush. Examples of useful power sources include lithium-ion batteries that may be rechargeable, e.g., a rechargeable lithium-manganese dioxide battery. In particular, lithium polymer batteries can be used as such batteries can provide increased safety. Other types of batteries, e.g., N50-AAA CADNICA nickel-cadmium cells, may also be used. Typically, the power source may include two 1.5V AA batteries generating a combined voltage of about 3V exiting the battery. Additionally, the power source may be sufficiently lightweight to allow for ease of use of the ionic toothbrush.

In some embodiments, the outer housing 114 may be accessible in order, for example, to remove and replace one or more batteries. For example, the outer housing 114 may include a battery cover 116, which may be in the form of a snap on or hinged snap on cover in the outer housing (e.g., generally positioned near the rear or lower section of the handle portion), such that when the cover is removed, the battery may be accessed. Such a configuration allows for easy access to portion of the outer housing that receiving the power source, e.g., for removal and replacement of the power source.

Generally, the outer housing 114 of the handle portion may be molded from a variety of different materials and in some embodiments, the handle portion may be molded from the same material as the brush head portion. For example, in some embodiments, at least a portion of the outer handle may be molded from a plastic material and/or a polymer material. Generally, the outer handle can include a variety of different materials or combinations of materials, for example, which include, but are not limited to, plastics, polymers, epoxies, resins, rubber, metals, and the like. In some embodiments, a portion of the outer housing may include a conductive resin. For example, as depicted in FIG. 3, a conductive resin may be present at an outer surface 118 of at least a portion of the outer housing of the handle portion. The conductive resin may be applied to the outer surface of the outer housing via any method commonly known in the art, e.g., molded, overlaid, stamped, and the like. For example, the conductive resin may be applied to the outer surface of the outer housing via injection molding (e.g., such as 2K injection molding), over molding, insert molding, runner molding, and the like. Any conductive resin as described herein above may be suitable for use as the conductive resin present at the outer surface of the handle portion.

In some embodiments, the handle portion may comprise a negative ionic contact 120 and a positive ionic contact 122, both positioned at least partially within the outer housing 114. In some embodiments, the negative ionic contact 120 may include any number of individual components, including, but not limited to, a metal contact plate, a metal screw, a metal spring, a metal clip, and/or any other type of metal contact configured to allow the transfer of ions therethrough. For example, as depicted in FIG. 5, the negative ionic contact may comprise a screw 124 and a metal clip 126 in contact with a negative metal plate 128. In some embodiments, the positive ionic contact 122 may include any number of individual components, including, but not limited to, a metal contact plate, a metal screw, a metal spring, a metal clip, and/or any other type of metal contact configured to allow the transfer of ions therethrough. For example, as depicted in FIG. 5, the positive ionic contact may comprise a screw 130 and a metal spring 132 in contact with a positive metal plate 134. In some embodiments, the negative ionic contact 120 and the positive ionic contact 122 may be in electrical communication with the conductive resin present at the outer surface of at least a portion of the outer housing of the handle portion.

In some embodiments, the handle portion may comprise one or more conductive surfaces, for example, the handle portion 104 may comprise a first conductive surface 136 and a second conductive surface 138 as depicted in FIG. 5. In other embodiments, one of the first and second conductive surfaces may be absent and/or one or more other components may be used in place of one or more of the conductive surfaces, e.g., such as a conductive component positioned on or within the handle portion. Generally, the one or more of the conductive surfaces may be formed of a variety of different materials, e.g., such as a conductive resin, a metal, a metal alloy, and the like. For example, one or both of the first conductive surface 136 and the second conductive surface 138 may at least partially include a conductive resin as defined herein, in some embodiments. As illustrated in FIG. 5, for example, the conductive resin in the handle portion 104 may be present at a first conductive surface 136 and a second conductive surface 138, both of which are positioned independently on the outer housing 114 of the handle portion 104. For example, in the depicted embodiment, the first conductive surface 136 is in physical contact with at least a portion of the positive ionic contact 122 and the second conductive surface 138 is in physical contact with at least a portion of the negative ionic contact 120. Generally, the first conductive surface, the second conductive surface, the negative ionic contact, and the positive ionic contact are all in electrical communication with at least the power source and, optionally, one or more components within the handle portion (e.g., such as a control component, motor assembly, etc.).

In some embodiments, the ionic toothbrush may comprise a control component 140 positioned within the handle portion 104. Generally, the control component may comprise one or more components, including processing circuitry and/or electronic components designed to control various functionality within the ionic toothbrush, e.g., such as voltage delivery (e.g., to various components within the toothbrush), timing mechanisms (e.g., a 30-second brush timer, a 1-minute brush timer, a 1.5-minute brush timer, a 2-minute brush timer, etc.), motor functionality (e.g., such as the motor speed), battery life, and the like. In some embodiments, the control component may be in the form of a printed circuit board assembly (PCBA), for example. In some embodiments, the control component may include a booster circuit capable of delivering the desired voltage from a battery to the brush head portion, e.g., to deliver a negative charge to the brush head portion via the conductive resin. In such embodiments, the booster circuit is designed to increase the typical voltage output (3V) from the battery prior to reaching the brush head portion of the ionic toothbrush. For example, the booster circuit may deliver a voltage of at least 4V, at least 5V, at least 6V, at least 7V, at least 8V, at least 9V, at least 10V, at least 11V, or at least 12V to the brush head portion of the ionic toothbrush. In some embodiments, the booster circuit may deliver a voltage to the brush head portion in the range of about 3V to about 12V, about 4V to about 11V, about 5V to about 10V, or about 6V to about 9V.

In some embodiments, the ionic toothbrush may comprise an input element 142 positioned at least partially on the outer housing 114 of the handle portion 104. In some embodiments, the input element may be in electrical connection with the control component positioned within the handle portion. In some embodiments, the input element, alone or in combination with the control component, may control one or more functions of the ionic toothbrush (e.g., activation and/or movement of one or more components therein) and/or provide for powering the ionic toothbrush on/off. In some embodiments, the input element and the control component can control various brushing features of the ionic toothbrush. For example, the control component may facilitate a brush timer function that can be trigger by a user of the toothbrush, e.g., the user may select a desired brushing time using the input element (or the brush time may already be programmed into the control component) and the control component can be configured to direct power from the power source to the motor, to activate the motor for the desired brushing time. In some embodiments, the user may also be able to control the motor speed using the input element to adjust the degree of brushing/gum massaging delivered by the toothbrush. For example, a user may select one or more different motor speed settings, which are controlled by the control component, and that provide a gentler (slower motor speeds) or more aggressive (faster motor speeds) brushing experience. Any component or combination of components may be utilized as the input element for controlling the function of the ionic toothbrush. For example, in some embodiments, the input element may be in the form of a push button, e.g., such as a thermoplastic elastomer (TPE) button that has been molded onto the outer housing of the handle portion.

In some embodiments, the ionic toothbrush may comprise a visual indicator 144 positioned at least partially on the outer housing 114 of the handle portion 104. In some embodiments, the visual indicator may be configured to provide a variety of indications, for example, to indicate an on/off status of the ionic toothbrush, and/or to indicate a charging status, and/or to indicate a remaining battery life, etc. Example visual indicator components may include, but are not limited to, light-emitting diodes (LEDs), quantum dot-based LEDs or the like, which may be illuminated with use or activation of the ionic toothbrush. Generally, the type of visual indicator and the indications provided therefrom may vary.

Generally, the control component 140 can be in electrical communication with the power source 112, and/or the negative ionic contact 120, and/or the positive ionic contact 122, and/or the first conductive surface 136, and/or the second conductive surface 138, and/or the input element 142, and/or the visual indicator 144, and/or one or more other components of the ionic toothbrush (e.g., such as a motor 146). For example, as depicted in FIG. 6, the control component 140 (e.g., the printed circuit board assembly) is in electrical connection with the power source via power source negative 112a and positive 112b terminals, with the motor via motor negative 146a and positive 146b terminals, with the positive ionic contact plate 128 via a positive ionic terminal 128a, with the negative ionic contact plate 134 via a negative ionic terminal 134a, with the input element via an input terminal 142a, and with the visual indicator 144 via an indicator terminal 144a.

Referring back to FIG. 5, the conductive resin present at the first conductive surface 136 is in electrical communication with the positive ionic contact 122 and the conductive resin present at the second conductive surface 138 is in electrical communication with the negative ionic contact 120 forming an open electrical circuit with the power source 112 and the control component 140. In some embodiments, this open electrical circuit may be activated when a user's hand comes into contact with the first conductive surface 136, e.g., closing the electrical circuit, or in other embodiments, this open electrical circuit may be activated by a user via the input element, e.g., such as when a user presses an on/off button on the exterior of the toothbrush. When the electrical circuit is closed, it should be noted that ions are allowed to flow freely throughout the electrical circuit and the components thereof (e.g., the positive and negative contacts, the conductive resin, the power source, the control component, and/or the motor). For example, when the circuit is closed, a negative charge generated by the power source may be translated through the closed circuit to the conductive resin present at the outer surface of the brush head portion (e.g., providing a negative charge in the brush head section of the ionic toothbrush). In some embodiments, the first conductive surface 136 and the second conductive surface 138 are positioned sufficiently separate from each other so as to prevent a user from contacting both conductive surfaces simultaneously during use (e.g., as depicted, for example, in FIG. 7). In some embodiments, the second conductive surface 138 may extend a defined length (L) from a top portion 150 of the outer housing 114 of the handle portion 104. For example, the second conductive surface may extend a length from the top portion of the outer housing of no more than about 30 mm, no more than about 25 mm, no more than about 20 mm, no more than about 15 mm, or no more than about 10 mm. In some embodiments, the second conductive surface may extend a length from the top portion of the outer housing of about 5 mm to about 30 mm, about 7.5 mm to about 20 mm, or about 10 mm to about 15 mm.

As noted above, the brush head portion 102 and the handle portion 104 may be removable and/or replaceable (multi-piece design) or they may be permanently connected forming a singular elongated body (one-piece design). Irrespective of the design, generally at least a portion of the conductive resin present in the brush head portion 102 is in contact with at least a portion of the conductive resin present in the handle portion 104. For example, as depicted in FIG. 7, at least a portion of the conductive resin present at the outer surface 108 of the brush head portion 102 may be in physical contact with the conductive resin present at the second conductive surface 138 of the handle portion 104. Such a configuration provides for a continuous electrical connection throughout the conductive resin (e.g., a continuous flow of ions therethrough) when the circuit is activated. Thus, when the electrical circuit is activated by a user of the toothbrush, a negative charge is translated to the conductive resin present at the outer surface of the of the brush head portion. Then, the negative charge is transferred to a mouth of a user of the ionic toothbrush upon insertion of the brush head portion into the mouth of that user. As noted above, the voltage delivered to the mouth of a user (via the conductive resin present at the outer surface of the brush head portion) may be in the range of about 4V to about 12V, or in some embodiments, in the range of about 6V to about 9V. Without intending to be bound by theory, it should be noted that providing higher voltages in the brush head portion (e.g., in the range of about 4V to about 12V, or preferably in the range of about 6V to about 9V) can advantageously provide an optimal user experience and desirable performance characteristics.

In some embodiments, the ionic toothbrush 100 may further comprise a conductive head ring 152 (e.g., as depicted in FIGS. 2, 7, and 8). In some embodiments the conductive head ring can be adapted for engagement between the handle portion 104 and the brush head portion 102 to form an elongated body, e.g., as depicted in FIG. 7. In some embodiments, the conductive head ring may be removable and/or replaceable, or in the case of a one-piece design, the conductive head ring may be permanently attached to both the brush head portion and the handle portion. Generally, a conductive resin may be present on at least a portion of the outer surface 154 of the conductive head ring 152. Positioning the conductive resin on the outer surface of the conductive head ring maintains continuous contact between at least a portion of the conductive resin positioned on the outer surface of the brush head portion, the conductive head ring, and the handle portion. The conductive resin may be molded onto at least a portion of the outer surface of the conductive head ring via any method commonly known in the art. For example, the conductive resin may be applied to the outer surface of the conductive head ring via injection molding (e.g., such as 2K injection molding), over molding, insert molding, runner molding, and the like. Any conductive resin as described herein above may be suitable for use as the conductive resin present at the outer surface of the conductive head ring.

As noted above, in some embodiments, the ionic toothbrush can include a motor 146 within the outer housing 114 of the handle portion 104. The motor may serve to facilitate one or more functionalities within the ionic toothbrush, for example, effectuating movement of one or more components within the handle portion 104 (e.g., such as a drive rod) and translating such movement to one or more components within the brush head portion 102 (e.g., such as a translation head and/or a bristle support member). For example, referring back to FIG. 5, the ionic toothbrush may comprise a drive rod 148 positioned at least partially within the handle portion 104 at one end thereof and, referring back to FIG. 4, the brush head section 16 may comprise a translation head 46 attached to a bristle support member 32 having the plurality of bristle tufts formed thereon.

In such embodiments, the drive rod 148 can be attached, connected, and/or coupled to the motor 146 within the handle portion 104 and at the same time be attached, connected, and/or coupled to the translation head 46 which is positioned within the brush head section 16, for example, when the brush head portion and the handle portion are engaged. In such embodiments, the drive rod 148 may be configured to engage the translation head 46 when the ionic toothbrush is in use. For example, during use of the ionic toothbrush, a linkage may be formed between the drive rod 148 and the translation head 46, such that movement of the drive rod 148 is directly transferred to the translation head 46 to facilitate the movement thereof. Generally, this linkage may be formed directly between the drive rod and the translation head, or in some embodiments, one or more mechanical components, gears, and/or connectors may be used to facilitate the linkage between, and the movement of, the drive rod 148 and the translation head 46. In some embodiments, the drive rod may be in the form of a singular continuous drive rod (e.g., when the brush head portion and the handle portion are permanently connected, such that the ionic toothbrush is in a one-piece design) or the drive rod may be temporarily detachable at one or more connection points along the drive rod (e.g., to facilitate embodiments wherein one or more of the brush head portion, the handle portion, and the conductive head ring are removable and/or replaceable, such that the ionic toothbrush is in a multi-piece design). Generally, the drive rod may comprise a substantially rigid material, such as a plastic material or a metal material. In some embodiments, the drive rod may be made by injection molding processes.

As noted above, in some embodiments, the motor 146 is operatively coupled with the drive rod 148 in the handle portion 104 such that actuation of the motor linearly and bi-directionally effectuates movement of the drive rod 148. In such embodiments, the movement of the drive rod 148 is communicated to the translation head 46 (as noted above) to ultimately effect a movement of one or more bristle support members (e.g., 110 as depicted in FIGS. 2 and 32 as depicted in FIG. 3) in at least one direction, for example, linearly or rotationally. Generally, it should be noted that movement of the bristle support member causes movement of the plurality of bristle tufts contained thereon (e.g., 106 as depicted in FIGS. 2 and 38 as depicted in FIG. 3). As noted above, the number of bristle support members and/or plurality of bristles tufts contained thereon may vary. Thus, each individual bristle support member (including the plurality of bristle tufts contained thereon) may be independently configured for movement in the same or different directions and/or speeds. For example, in some embodiments, one bristle support member may be configured for linear movement while another bristle support member may be configured to move rotationally. In some embodiments, one bristle support member may be configured to move faster, slower, or at the same speed as another bristle support member therein. In general, the configuration of the bristle tufts and/or support members in the brush head portion and the movement thereof is not considered to be limited to the examples embodiments provided herein above.

The terms "about" or "substantially" as used herein can indicate that certain recited values or conditions are intended to be read as encompassing the expressly recited value or condition and also values or conditions that are relatively close thereto. For example, a value of "about" a certain number or "substantially" as certain value can indicate the specific number or value as well as numbers or values that vary therefrom (+ or −) by 5% or less, 4% or less, 3% or less, 2% or less, or 1% or less. Likewise, a statement "about" a certain condition or "substantially" a certain condition can indicate that the condition is exactly met or that the condition encompasses normal variations that would be expected to occur in manufacturing and/or that are acceptable variations that do not affect the reason or use for the stated condition. In some embodiments, the values or conditions may be defined as being express and, as such, the term "about" or "substantially" (and thus the noted variances) may be excluded from the express value.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An ionic toothbrush comprising:
   a handle portion having an outer surface arranged for contact by a hand of a user during use of the ionic toothbrush;
   a brush head portion having an outer surface and also including a plurality of bristle tufts;
   a first conductive portion present on the outer surface of the handle portion, the first conductive portion comprising a conductive resin;
   a second conductive portion present on the outer surface of the handle portion so as to be separated from the first conductive portion, the second conductive portion comprising a conductive resin;
   a third conductive portion present on the outer surface of the brush head, the third conductive portion comprising a conductive resin, the third conductive portion and the second conductive portion being arranged to be adjacent one another when the brush head portion is engaging the handle portion; and
   an electrical circuit configured to transmit a negative electrical charge from the second conductive portion to the third conductive portion and through at least a portion of the brush head.

2. The ionic toothbrush of claim 1, wherein one of the first conductive portion and the second conductive portion is positioned so as to be in contact with the hand of the user when the ionic toothbrush is in use.

3. The ionic toothbrush of claim 1, wherein the handle portion and the brush head portion are in a one-piece design.

4. The ionic toothbrush of claim 1, wherein the brush head portion is removable and/or replaceable.

5. The ionic toothbrush of claim 1, further comprising a power source, a positive ionic contact, and a negative ionic contact within the handle portion.

6. The ionic toothbrush of claim 5, wherein the first conductive portion is in electrical communication with the positive ionic contact, the second conductive portion is in electrical communication with the negative ionic contact, and both of the first conductive portion and the second conductive portion are in electrical communication with the power source for forming the electrical circuit.

7. The ionic toothbrush of claim 6, wherein the electrical circuit is configured to be closed and thus activated when a user's hand comes into contact with the first conductive portion.

8. The ionic toothbrush of claim 7, wherein the handle portion of the ionic toothbrush is configured so that a negative charge is delivered to the third conductive portion present on the outer surface of the brush head when the electrical circuit is closed and thus activated.

9. The ionic toothbrush of claim 1, wherein the the second conductive portion is separated from the first conductive portion by a sufficient distance so as to prevent a user from contacting both conductive portions simultaneously during use.

10. The ionic toothbrush of claim 1, further comprising a conductive head ring adapted for engagement between the handle portion and the brush head portion to form an elongated body.

11. The ionic toothbrush of claim 10, wherein the conductive head ring defines a fourth conductive portion at an outer surface thereof, the fourth conductive portion comprising a conductive resin.

12. The ionic toothbrush of claim 11, wherein the conductive resin of the second conductive portion, the third conductive portion, and the fourth conductive portion defines a continuous pathway of electrical contact across at least a portion of the brush head portion, the conductive head ring, and the handle portion.

13. The ionic toothbrush of claim 1, wherein the conductive resin of the first conductive portion, the second conductive portion, and the third conductive portion comprises an electrically conductive thermoplastic polymer or resin material.

14. The ionic toothbrush of claim 1, wherein the brush head portion further comprises a translation head attached to a bristle support member having the plurality of bristle tufts formed thereon.

15. The ionic toothbrush of claim 14, further comprising a motor and a drive rod positioned within the handle portion, wherein the drive rod is configured to engage the translation head when the ionic toothbrush is in use.

16. The ionic toothbrush of claim 15, wherein the motor is operatively coupled with the drive rod in the handle portion such that actuation of the motor linearly and bi-directionally effectuates movement of the drive rod that is communicated to the translation head to effect a movement of the bristle support member in at least one direction, either linearly or rotationally.

\* \* \* \* \*